United States Patent Office 3,470,172
Patented Sept. 30, 1969

3,470,172
PROCESS FOR PRODUCING CERTAIN AMINO SUBSTITUTED NITRO PYRIDINES
Harold A. Kaufman, Piscataway, N.J., assignor to Mobil Oil Corporation, a corporation of New York
No Drawing. Filed Mar. 2, 1967, Ser. No. 619,941
Int. Cl. A01n 9/22; C07d 99/04, 99/02
U.S. Cl. 260—247.5                    9 Claims

ABSTRACT OF THE DISCLOSURE

A process for manufacturing N-substituted nitropyridines by reacting hydroxy nitropyridines with primary and secondary amines, as well as cyclic amines. The nitropyridine products obtained are useful as herbicides.

CROSS REFERENCE TO RELATED APPLICATIONS

A method for using the disclosed amino nitropyridines in controlling plant growth is disclosed in an application entitled Amino Nitropyridines As Herbicides, filed of even date herewith in the name of Patrick Robert Driscoll, and having the Ser. No. 619,958, now abandoned. For example, it is disclosed therein that 4-dipropylamino-3,5-dinitropyridine is particularly useful in controlling Johnson grass, barnyard grass and pigweed in pre-emergence treatment at a rate of 8 pounds per acre.

BACKGROUND OF THE INVENTION

Field of the invention

The invention relates to a process for the manufacture of amino nitropyridines. More particularly it relates to a process for the manufacture of said pyridines by the reaction of mono- and di-substituted amines with nitropyridines.

Description of the prior art

Several methods are known to the art for producing the simpler members encompassed by the present invention. It is known, for example, that the silver salt of 2-hydroxy-3,5-dinitropyridine, when reacted with the appropriate amine, will yield an amino nitropyridine. It is further known that an alkoxy dinitropyridine will yield an amino nitropyridine when reacted with an amine. Thus 2-ethoxy-3,5-dinitropyridine and diethylamine react to give 2-diethylamino-3,5-dinitropyridine. These methods are disclosed in Roczniki Chem., vol. 39(12), pages 1811–17 (1965) (in Polish). The article is abstracted in Chemical Abstracts, vol. 64, page 15831a (1966).

While the processes of the prior art provide nitropyridines in acceptable yields, they do have certain disadvantages which make them expensive to use, both from the standpoints of material cost and number of steps required during synthesis. The most obvious fault with the method requiring the silver salt of the nitropyridine is the cost of the silver. Another is the added step of preparing the silver salt from the hydroxy nitropyridine. The method of the present invention utilizes directly the hydroxy nitropyridine, thus avoiding any intermediate step. Furthermore, the present invention avoids the necessity for preparing an ether of the nitropyridine, which starting material is required in the process involving alkoxy nitropyridines.

SUMMARY OF THE INVENTION

In accordance with the present invention there is provided a process for the manufacture of a compound of the formula

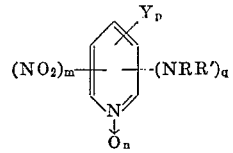

wherein R is selected from the group consisting of alkyl $(C_1-C_8)$, cycloalkyl $(C_3-C_6)$, alkenyl, $(C_2-C_7)$, alkoxy, alkoxyalkyl, phenyl and substituted phenyl, R' is selected from the group consisting of R and hydrogen, and wherein R and R' taken together with N is a heterocycle, Y is selected from the group consisting of alkyl $(C_1-C_6)$, sulfone, sulfoxide, sulfonic acid, carboxyl, methoxy and cyano, $m$ is 1 or 2, $n$ is 0 or 1, $p$ is 0, 1, 2, or 3 and $q$ is 1, 2, or 3, from the appropriate nitropyridine and amine.

In the above, "heterocycle" will be understood to include moieties derived from piperidine, morpholine, aziridine, pyrrolidine, and the like.

In general aspect the inventive process is carried out by reacting a hydroxy nitropyridine of the formula

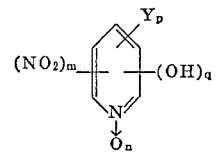

wherein Y, $m$, $n$, $p$, and $q$ are as defined above, with an amine of the formula

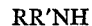

wherein R and R' are as already defined, at a temperature and for a time to effect reaction. The presence of an acid catalyst will be useful in accelerating the reaction, although the process may be carried out in the absence of a catalyst. Since the products are generally solids, it is desirable to run the reactions in the presence of a solvent, and those solvents which form azeotropes with water will be particularly useful.

The hydroxy nitropyridine intermediates may be prepared in known ways, as shown for example in an article abstracted in Chemical Abstracts, vol. 60, page 9241 (1964).

The chemicals obtained from the invention process may be used as herbicides in accordance with the disclosure in the application referred to in the cross reference.

DESCRIPTION OF SPECIFIC EMBODIMENTS

The temperatures at which the reaction is run are not especially critical. he two main considerations with repect to temperature are rate of reaction and product or reactant decomposition. Thus the reaction may be run from about 25° C. to just below the decomposition point of the product or any of the reactants. Preferably, temperatures within the range of from about 75° C. to about 150° C. will be used.

Times of reaction are not critical, and they will vary with the nature of the reactants and solvents used, as well as with the temperatures employed. From a commercial viewpoint, the shortest time practicable is always desired, but in the operation of the present process, times of 8 hours or more will not be uncommon.

In the specific examples which follow, benzene is used as the solvent, but the process is not limited thereto. Any general purpose inert organic solvent in which the product is soluble can be used. Also, all reactants will preferably be soluble in the solvent selected, but this is not an absoluble prerequiste. So long as at least one of the reactants is soluble therein, the solvent may be employed if an acceptable rate of reaction can be maintained. In brief, it can be said that the selection of a general purpose solvent can be made upon the criteria usually considered when solid reactants and products are involved.

It is desirable to remove water as it is formed during the reaction. This may be done in at least three ways. First, the solvent chosen may be one which forms an azeotrope with the water formed during the reaction. By continually removing the azeotropic mixture, water may be effectively removed. Some of the known solvents which form azeotropes with water can be found in Book Number Six of the Advances in Chemistry Series, Azeotropic Data, pages 6 through 12, published June 1952 by the American Chemical Society. Second, solvents having boiling points above 100° C. and which do not form azeotropes with water may be used. When such solvents are utilized, water formed during the reaction is removed by distillation, either at atmospheric pressure or under slight vacuum. One example of a solvent which does not azeotrope water is diethylene glycol. Others may be found in the reference just cited. Third, a chemical agent can be employed to remove the water which is formed. One such agent is N,N-dicyclohexylcarbodiimide.

In practicing the process, it was noted that a suitable acid catalyst is advantageous, although its presence may not be necessary for acceptable results. When employing a catalyst, some of the more useful ones will be p-toluene sulfonic acid, sulfonic acid ion exchange resin, and acidic clays.

The following examples will specifically illustrate the inventive process. It will be understood that they are for purposes of illustration only, and are not intended to limit the invention. The invention will be limited only by the disclosure herein, the claims, and equivalent modifications which the art would naturally think of in view of this disclosure. In the examples, "parts" are parts by weight.

EXAMPLE 1

4-dipropylamino-3,5-dinitropyridine

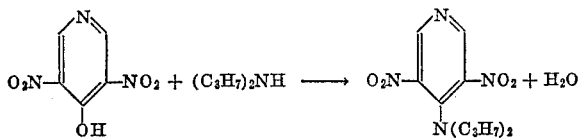

A mixture of 5 parts of 3,5-dinitro-4-hydroxypyridine, 4 parts of dipropylamine, 0.1 part of p-toluene sulfonic acid and about 175 parts of benzene were placed in a flask fitted with a Dean-Stark trap. The reaction mixture was refluxed for 8 hours, with gentle stirring. At the end of 8 hours, the benzene was removed by distillation at 80° C. at atmospheric pressure, and then to a final pot temperature of 26° C. at 100 mm. pressure, leaving a yellow solid. Upon recrystallization from benzene, 7.2 g. of product was obtained. The product had a M.P. of 123–126° C. and 21.59% of nitrogen (theory 20.89%). NMR and IR determinations also supported the proposed structure.

Example 2

2-dipropylamino-3,5-dinitropyridine

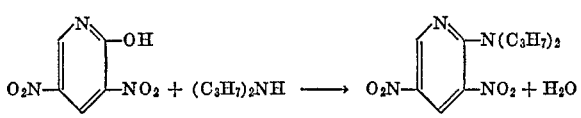

The procedure of Example 1 was followed, including proportions of reactants, solvent and catalyst, except that 2-hydroxy-3,5-dinitropyridine was substituted for the 4-hydroxy-3,5-dinitropyridine.

The following compounds will further illustrate the method. They may be prepared substantially in accordance with the process outlined in Examples 1 and 2. Again, it will be understood that they are offered for the purpose of illustration only, and are not intended to limit the scope of the process.

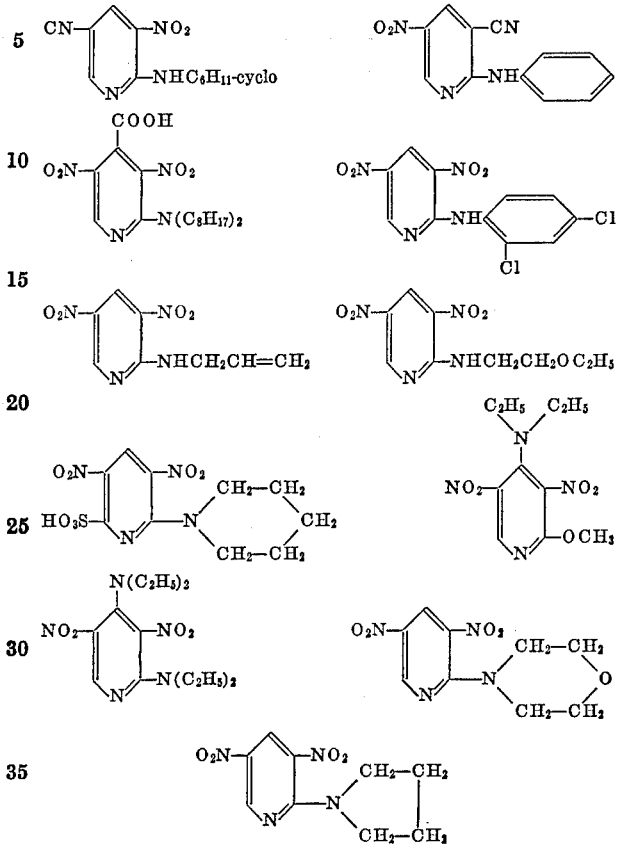

I claim:

1. A process for the manufacture of a compound of the formula

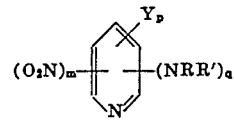

wherein:
R is selected from the group consisting of alkyl ($C_1$–$C_8$), cycloalkyl ($C_3$–$C_6$), alkenyl ($C_2$–$C_7$), phenyl and halophenyl;
R' is selected from the group consisting of R and hydrogen;
R and R' taken together with N is

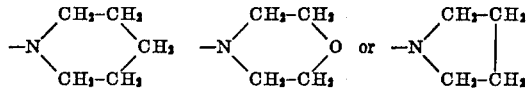

Y is selected from the group consisting of hydrogen and methoxy,
$m$ is 1 or 2;
$p$ is 0 or 1; and
$q$ is 1; (or 3)

which comprises reacting a nitropyridine of the formula

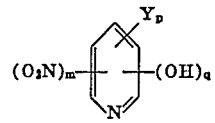

in which Y, $m$, $p$, and $q$ are as herein defined with an amine of the formula

RR'NH wherein R and R' are as defined herein, at a temperature and for a time to effect reaction, said temperature being at least 25° C., but below the decomposition temperature of either the said nitro pyridine compound or amine.

2. The process of claim 1, in which the temperature is from about 75° C. to about 150° C.

3. The process of claim 1, in which the reaction is run in the presence of an acid catalyst selected from the group consisting of p-toluene sulfonic acid, sulfonic acid ion exchange resin, and acidic clays.

4. The process of claim 3, in which the acid catalyst is p-toluene sulfonic acid.

5. The process of claim 1, in which the reaction is run in the presence of an inert organic solvent.

6. The process of claim 5, in which the solvent is one which will form an azeotropic mixture with water.

7. The process of claim 5, in which the solvent has a boiling point greater than 100° C.

8. The process of claim 1, in which the compound produced is 4-dipropylamino-3,5-dinitropyridine.

9. The process of claim 1, in which the compound produced is 2-dipropylamino-3,5-dinitropyridine.

References Cited

Klingsberg, Pyridine and Derivatives, part 3, Interscience, pp. 651–53, (1962).

HENRY R. JILES, Primary Examiner

A. L. ROTMAN, Assistant Examiner

U.S. Cl. X.R.

71—88, 94; 260—247.1, 247.2, 293, 193.4, 294, 294.7, 294.8, 294.9, 295, 296